L. C. TRENT.
APPARATUS FOR TREATING SOLID BEARING SOLUTIONS.
APPLICATION FILED JUNE 12, 1918.

1,307,329.

Patented June 17, 1919.
2 SHEETS—SHEET 1.

WITNESS:
Wm F. Drew

INVENTOR.
L. C. Trent
BY
Asher & Tolles
ATTORNEYS.

L. C. TRENT.
APPARATUS FOR TREATING SOLID BEARING SOLUTIONS.
APPLICATION FILED JUNE 12, 1918.
1,307,329.
Patented June 17, 1919.
2 SHEETS—SHEET 2.
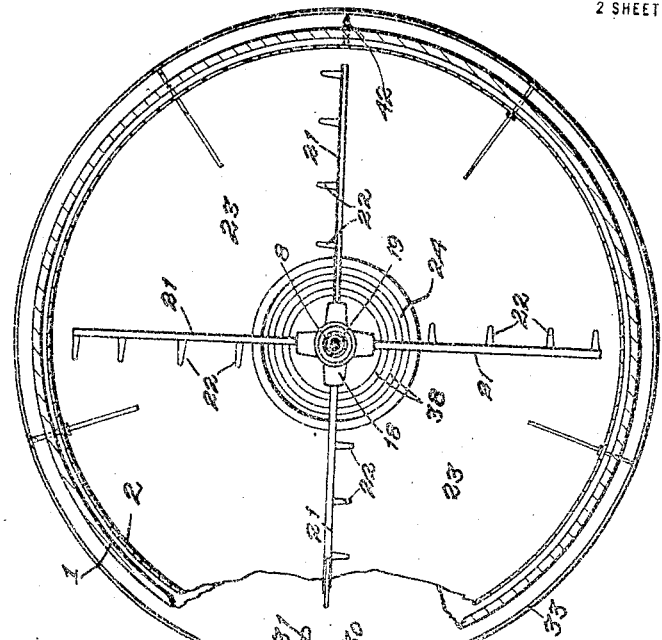
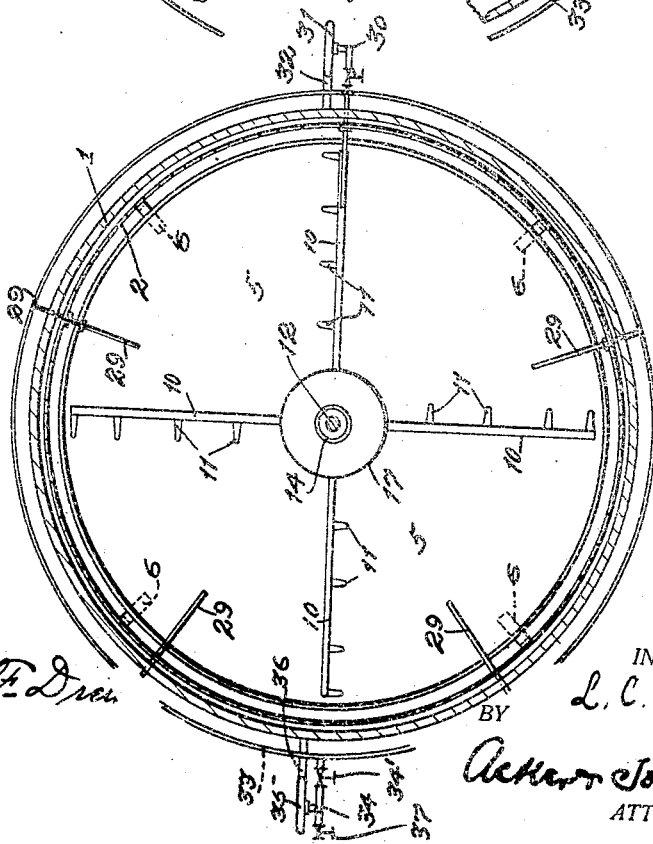
WITNESS:
INVENTOR.
L. C. Trent
BY
ATTORNEYS.

UNITED STATES PATENT OFFICE.

LAMARTINE C. TRENT, OF LOS ANGELES, CALIFORNIA.

APPARATUS FOR TREATING SOLID-BEARING SOLUTIONS.

1,307,329. Specification of Letters Patent. Patented June 17, 1919.

Application filed June 12, 1918. Serial No. 239,585.

*To all whom it may concern:*

Be it known that I, LAMARTINE C. TRENT, a citizen of the United States, residing at Los Angeles, in the county of Los Angeles and State of California, have invented certain new and useful Improvements in Apparatus for Treating Solid-Bearing Solutions, of which the following is a specification.

The hereinafter described invention relates to an apparatus for the continuous treatment of sand and slimes for the dissolving or separation of the valuable minerals or elements which they contain and is more particularly applicable in the treatment of materials such as nitrates, potash and alum, and for the treatment of ores, cyanid slimes or other liquids containing solids to be extracted therefrom, the invention being more particularly an improvement on the apparatus set forth and described in United States Letters Patent #1152769, granted me under date of September 7, 1915, for an improved apparatus for treating solid bearing solutions. In the said patented apparatus the material to be treated is worked therein as separate charges, each charge consisting of a certain proportion of sand, fine slimes and a suitable solution, or water, and in the operation of such material within such machine the coarser material or that which is coarser than 100 mesh cannot be kept in suspension excepting during agitation, for as soon as agitation ceases the same drops into a solid bed of sand at the bottom of the tank or vessel in which the material is being treated.

Under the present invention, the machine is of such design and construction as to permit of continuous operation on the sands and slimes, the arrangement of the working parts being such as to provide means wherein the sand to be separated can be withheld or retained at a point a distance removed from the bottom of the machine until they have been subjected to agitation for a sufficient length of time to dissolve the valuable minerals or elements which they contain and which it is desired to separate therefrom; in other words, the downward travel or movement of the sand within the body in which the same is treated is retarded or arrested, and at such time is subjected to thorough agitation to permit the action of the solution in which the agitation takes place to separate or dissolve therefrom all soluble valuable particles; this retardation of the downward travel of the sand which flows into the machine preventing the rapid settlement thereof on the bottom of the machine which otherwise would take place, and which settlement does not permit of the sands being subjected to agitation for such a duration of time as to permit of efficient dissolution of the soluable contents and separation of the solids of the ore or whatever other material may be under treatment.

In the operation of the machine one of the advantages resulting therefrom, is that all of the current which takes place within the tank or vessel for the treatment of the material is upwardly and which upward flow or current of the barren solution is utilized for driving or forcing upwardly and keeping the dissolved values from settling downwardly and finding their way into the discharge outlet of the apparatus. Another valuable feature of the apparatus resides in the fact, that in the treatment of the material thereby the charge can be kept in a condition of agitation while the ore or material to be treated is fed into and through the machine in order that the agitated solution may be brought up to the desired strength or values in chemicals, and only sufficient liquid is introduced into the bottom to overflow a solution of sufficient strength to cause crystallization, thereby providing a machine which is adapted for extracting a saturated solution from any chemicals, such as nitrates, potash or alum, at crystallizable strength without regard to the volume of liquid in which the agitation is being carried out.

The present apparatus comprising essentially a suitably constructed receiving tank provided interiorly with means for subdividing the same to provide a plurality of agitating zones, there being arranged within each agitating zone means for creating a gradual thickening of the material under treatment, with means for causing or producing a circulation of the pregnant solution relative to each of the agitating zones, and further provided with means for supplying fresh liquid for the replacement of the clear solution which overflows from the receiving vessel within which the material is being treated.

In general, the invention comprises primarily coöperating means for efficiently recovering metals of value such as gold, silver and the like, from ores such as slimes and sands by subjecting such ores in a finely comminuted condition to the action of a suitable solvent, as, for instance, cyanid of sodium, cyanid of potassium or other suitable chemicals which co-act with the material under treatment for dissolving the metal values contained therein by contacting therewith, so that classified slimes may be thickened and separated from their original liquids and replaced with fresh solutions or liquids without increasing their volume or diluting their values, thus insuring the maximum recovery of dissolved values in limited volumes of solution.

To comprehend the invention reference should be had to the accompanying sheets of drawings, wherein—

Fig. 2 is a transverse sectional view of the apparatus illustrated in Fig. 1, said view being taken adjacent the upper end thereof.

Fig. 3 is a transverse sectional view of the apparatus illustrated in Fig. 1, the view being taken adjacent the base or bottom thereof.

Figure 1:
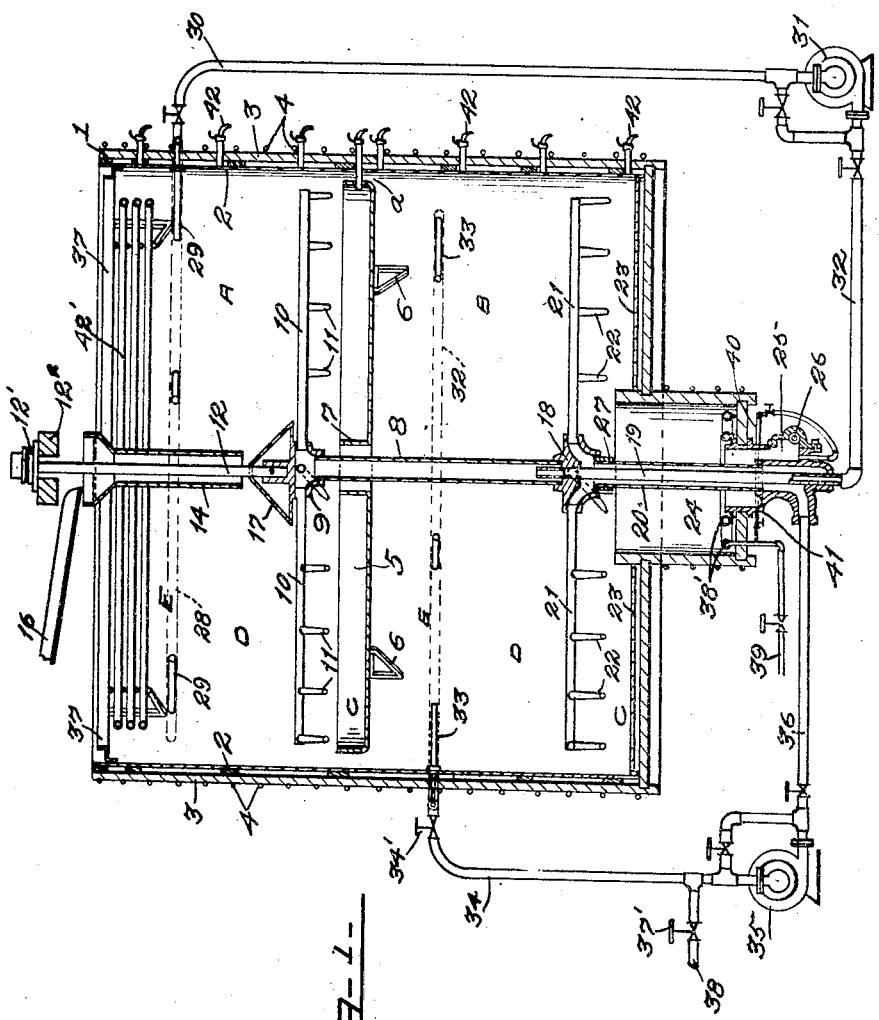
Figure 1 is a vertical sectional view of the improved apparatus for the treatment of liquid generally from which the solids are to be separated and the values recovered therefrom.

In the drawings, the receiving or mixing tank for the reception of the material to be treated is indicated as comprising an interior open top wooden or metallic tank or shell 1, which is surrounded by wooden bands or distance pieces 2, which in turn are inclosed by redwood staves and laggings 3, fastened or held together by the usual steel rods or bands 4 employed for the construction of wooden tanks, thus forming a double wall or insulated tank with an air space between the interior and exterior walls thereof for the retention of heat. Within the shell 1 and approximately midway of the height thereof is arranged or disposed horizontally a tray or pan 5, which is of a diameter slightly less than the interior diameter of the tank or shell 1 to leave an annular passageway $a$ therebetween, the said tray or pan being supported or held in place by means of a series of spaced brackets 6 secured to and inwardly projected from the inner wall of the shell or tank 1. Through a hub or guide 7 of the said tray or pan 5 is extended a tubular shaft 8, which at its upper end is connected to a head 9 from which radially spring a series of distributing arms 10, each arm being provided with a series of tangentially downwardly projected disposed nozzles 11, the said arms 10 and nozzles 11 constituting with the head 9 a freely rotatable agitator held a slight distance above the upper surface of the pan or tray 5. From the head 9 is upwardly extended a supporting rod 12, which at its upper end is suspended from ball bearings $12'$ held to a suitable overhead support $12^2$. Surrounding the supporting rod 12 and held in position in any suitable manner is a tubular feed shell 14 through which the slime and sand, pulp or other material to be treated is fed into the machine, the same being conveyed to the member 14 by means of a feed chute 16. The material as delivered from the bottom of the feed shell 14 falls onto the cone shaped or tubular distributer 17 which surrounds the head 9 of the agitator from which distributer the material flows toward the surface of the pan 5. The tubular shaft 8 connects at its lower end to a distributing head 18, through which head extends a tubular pipe section 19 which is coupled at its upper end to the lower interior extremity of the tubular shaft 8. The shaft section 19 is surrounded by a shell 20, which at its upper end connects with the distributer head 18, and from the said distributer head projects radially a series of distributing arms 21, which arms are provided with a series of tangentially disposed downwardly projected nozzles 22. The said head 18 and arms 21 with the jet nozzles 22 constitute an agitator situated a short distance above the bottom 23 of the tank or shell 1. The said bottom 23 is provided with a sump or well 24, the upper end portion of the wall of the said sump being projected a slight distance above the inner surface of the bottom 23, and through said sump or well extends the tubular shaft section 19 with its surrounding shell 20. The sump or well 24 is provided with a trap 25 for the reception of the treated sand to be discharged from the apparatus through the discharge outlet 26. The connected rotating structural parts of the apparatus are suspended from the supporting rod 12, which, as previously stated is in turn suspended from ball bearings $12'$ and which in the present case constitute the only support for the revolving mechanism outside of a loose guide 27 at the top of shell 20.

The bed or pan 5 divides the interior of the tank or shell 1 into a plurality of compartments marked respectively A and B in the drawings, so that during the working of the apparatus for the treatment of slimes and sand and other material to be worked under agitation there is created an upper zone of agitation and a lower zone of agitation, each zone of agitation being above the centrifugal agitators supported by the tubular centrally disposed shafting of the apparatus. Within the upper compartment of the tank or receiver and situated above what is termed the agitating zone, is located a circular pipe 28, which, in the present case, is provided with a series of suction inlets 29, the said pipe being extended to the outside of the receiving tank or shell and connected by a valve controlled pipe 30 with a centrifugal pump 31, the discharge of which pump is connected in turn by a valve control pipe extension 32 with the lower end of the tubular shaft section 19, so that the liquid from within the upper compartment of the receiving tank or shell is caused to circulate from above the agitating zone through the pipe connections and the tubular shafts 19, 8 and head 9 into the radially disposed arms 10 of the upper agitator, and discharging from the nozzles 11 thereof, under pressure, discharge as jet streams onto the material received onto the tray or pan 5, the pressure of such jet stream causing thorough agitation of the heavier material disposed on the said pan or bed and freeing the valuable elements therefrom.
Within the lower compartment B of the apparatus there is disposed a circular suction pipe 32, provided with a series of inlets 33, the said pipe extending to the outside of the apparatus and being connected by a valve controlled pipe 34 to a centrifugal pump 35, the discharge outlet of said pump being connected by the valve controlled pipe section 36 to the shell 20 surrounding the tubular shaft section 19, so that the liquid withdrawn from the chamber B is forced back into said compartment under pressure through the shell 20, head 18 and radially disposed arms 21, and discharged under pressure as jet streams from the nozzles 22, the pressure of which streams bearing on the material disposed on the bottom of the tank or receiver thoroughly agitates the same for dissolving or separating therefrom such values as may be contained therein after discharging from the upper chamber or compartment A.

In the operation of the apparatus, the tank or receiver 1 is supplied with an initial charge of liquid within which the material is to be worked provided the material fed into the machine does not contain sufficient solution to dilute the ore, and the material to be treated is fed into the machine through the diffuser 14 in either a wet or dry condition, and as fed therein falls onto the distributer 17, and is spread out in a thin fanlike stream moving downwardly toward the central portion of the tray or pan 5. As the liquid is maintained under circulation and agitated due to the liquid streams issuing from the jet nozzles 11 and 22 of the agitators situated within the compartments A and B, the first action is for the jet steams of the upper agitator to act against the material gradually settling onto the bed or pan 5, and to thoroughly agitate the same. The tendency for the heavy sand is to settle or fall onto the upper surface of the tray, bed or pan 5, while the slimes or lighter portions of the material are kept in suspension above the discharge jets of the agitator within the upper compartment A. As the feed of the material continues within the machine the sand or heavier portions thereof gradually settle and accumulate on the surface of the tray, pan or bed 5, adjacent the center thereof and is gradually crowded toward the periphery of the said tray or pan. After a time, the said pan or tray becomes full or filled with sand or heavier portions, it being understood that agitation is maintained throughout the entire settling period thereof, and as it takes considerable time for the sand to fill the tray thorough agitation and washing out takes place. However, the sand gradually crowds over the periphery of the bed, pan or tray 5 and overflowing passes through the annular passageway $a$ into the lower compartment B of the apparatus and as such overflowing materials contain portions of the valuable particles to be recovered therefrom, the same is subjected within the lower compartment B of the apparatus to the same action to which it was subjected in the upper compartment, while gradually settling onto the bottom 23 of the tank or receiving vessel, and it is there subjected to the agitating action of the jet streams of the circulating liquid discharging from the nozzles 22 of the agitating arms 21. The sand thus overflowing from the pan, bed or tray 5, falls onto the bottom 23 near the outer periphery thereof and gradually accumulates and builds up inwardly toward the center thereof until the same overflow the wall of the sump or well and is received therein. As a matter of fact, the bottom 23 of the tank or receiver to all intents and purposes constitutes a pan or tray for holding and retaining the sand disposed thereon until gradually built up while maintained under agitation to overflow into the sump or well 24. The downward retardation or arresting of the sand contained within the material by the pan or tray 5 while subjecting the same to agitation within the upper or primary compartment A, taken in conjunction with the retarding action of the secondary pan formed by the bottom wall of the tank or receiver, makes it possible to keep the sands in agitation a sufficient length of time to effect satisfactory and thorough extraction of the values contained therein, so that the same or the heavier deposited material ultimately escaping from the bottom 23 by overflowing into the sump or well 24 may be considered as waste gangue or material from which all values have been extracted or dissolved.

Under the apparatus as constructed for the working or treating of material of the class desired, there is provided within the tank or receiver for the material a plurality of zones in each compartment thereof, and which zones are designated as sand agitating zones, slime agitating zones and clear zones, indicated respectively by the reference numerals C, D and E, the sand agitating zones being confined between the agitating arms and the bottom of the pans for receiving the same, while the slime agitating zones are formed between the agitating means and the suction pipes 32 and 28 respectively, the clear zones being above the suction pipe in each of the compartments of the tank or receiver within which the material is treated. During the treatment of the material within the tank or receiver, and while subjected to the action of the jet streams from the agitators the same is maintained in a condition of agitation and the slimes are kept maintained in suspension, causing a gradual thickening of the slimes within the agitation zones and a settling of the sands or heavier particles of non-valuable material, the pregnant clear solution with the dissolved values gradually working upwardly into the clear zones and that from the lower clear zone working upwardly through the thickened body of slimes within the upper chamber to within the upper clear zone, the clear pregnant liquor or dissolving solution gradually overflowing into the discharge launder 37, which is situated within the tank or receiving vessel adjacent its upper edge. It will be understood that the outflowing pregnant solution to be replaced is delivered into the tank or receiver through the suction of the centrifugal pump 35, during which case the valve 34' of the pipe connection 34 is closed and the valve 37' of the connection 38 is opened to admit the pregnant solution to be drawn from a suitable source of supply and which is forced by the action of the pump through the pipe connection 36 into the lower chamber B of the tank or receiving vessel in which the material is being treated, flowing therein under pressure through the agitator situated within the lower chamber. Inasmuch as there is no outlet for the pregnant solution or liquid other than to overflow into the launder 37, the inflowing solution is gradually rising to the overflow and the amount of the overflow will depend on the quantity of pregnant solution which is admitted into the tank from the connection 38.

Within the bottom portion of the sump or well is, in the present case, located a plurality of circular pipes 38', which are perforated on the underside thereof and with which pipes connect an outside supply pipe 39 for supplying to the pipes 38' water under pressure, which water discharges into the sump or well adjacent the bottom thereof and into the charge contained therein, so as to loosen the same for a free flow into the discharge outlet 26, and the water so admitted into the sump or well may be utilized as replacement water if so desired.

There is also arranged around the discharge casting a bustle pipe 40 which is provided with auxiliary water connections 41 by means of which water jets are ejected within the discharge outlet way to loosen the clotted or congested charge, should such occur for any reason when the machine has ceased operation or for other causes.

In the operation of the apparatus it will be understood that the receiving tank or vessel is constantly filled with slimes under agitation, with the exception of the two clear zones, and that the coarse solids or sands eventually discharge into the well or sump 24. There is a series of try-out cocks 42 extended through the wall of the receiving vessel or tank and associated with each chamber or compartment thereof, the purpose of which is to enable the operator to test the density and condition of the solution at the respective levels of the tank during the treatment of the material contained therein.

Certain material to be treated such as nitrates, potash, alum, and slime material require that hot water be used as the wash solution. In this case, the hot water may be introduced through the connection 35, and the charge in the tank by the admission of such hot water kept at as high a degree as possible and it is desirable in order that the nitrates, potash and alum under treatment may not crystallize and precipitate before reaching the receptacle designed therefor, that the charge when it reaches the upper clear zone of the tank be maintained at the proper temperature. For this purpose, there is arranged within the upper portion of the tank or receiver a series of heating coils 42' which are connected in any suitable manner with a source of supply for the forcing of a heating medium therethrough.

By the use of the described apparatus the ore to be treated is taken in at the upper end of the tank or receiver and as delivered thereto maintained in a condition of agitation and the values dissolved or extracted therefrom at one and a continuous operation, the pulverized ore to be treated being fed continuously into the machine and remaining therein under agitation such a length of time so that when the same reaches the discharge the values of whatever nature contained therein are dissolved therefrom, the water introduced within the sump or well causing an upward current sufficient to keep the quantity of liquid or any of it from flowing into the discharge.

The apparatus is simple, efficient and practical in the operation for the handling of large quantities of material to be treated, it being understood that the pressure of the water ejecting from the tangentially disposed nozzles 22 and 11 of the upper and lower agitator respectively, being sufficient to impart rotary motion to such agitators, no outside source of power being required for imparting rotary movement to the said agitators.

I am aware that changes may be made in the arrangement of the working parts and details of construction thereof shown and described herein without causing a departure from the nature and spirit of the invention, and I do not wish to be understood as limiting or confining myself to such details of construction, but on the contrary wish to be understood as claiming the invention as broadly as the state of the art will permit.

Having thus described my invention, what I claim as new and desire to protect by Letters Patent is:—

1. A leaching apparatus comprising a receiving vessel provided with a discharge outlet, means within the vessel for retarding the downward flow of material and dividing the interior of the vessel into an upper and lower compartment, devices for supplying to the vessel material to be treated, agitating means situated within each compartment of the vessel, and mechanism for withdrawing liquid under treatment from each chamber of the vessel and returning the same thereto under pressure through the agitating means thereof.

2. A leaching apparatus comprising a receiving vessel provided with a discharge outlet, a horizontally disposed retaining pan arranged within the vessel for receiving and for retarding the downward movement of the material for treatment delivered within the vessel, said pan dividing the interior of the vessel into an upper and lower compartment, means for supplying material for treatment to the upper compartment of the vessel, and associated means for agitating the material delivered within the vessel.

3. A leaching apparatus comprising a receiving vessel provided with a discharge outlet, of means within the vessel for retarding the downward movement of material for treatment delivered within the vessel, and mechanism disposed above and below said means for maintaining the material under treatment in a condition of agitation.

4. A leaching apparatus comprising a receiving vessel having an outlet in its bottom for solids, of means for supplying material for treatment into said vessel at the top thereof, a retaining pan of less diameter than the interior of the vessel and supported therein a distance from its bottom for dividing the same into an upper and lower treating compartment, a rotary agitator arranged within each of said compartments, a suction pipe arranged above each of said agitators, a suction means without the vessel for withdrawing solution through said pipes from within the treating compartments, return conduits extended from said suction means and connected with the agitators within the vessel, whereby the said agitators constitute discharges for the returned solution.

5. A leaching apparatus comprising a receiving vessel having its interior divided into an upper and lower compartment, of roatary agitating means situated within each of said compartments, a suction pipe arranged above each of the agitators, suction means located outside of the vessel and connected with the suction pipes for the withdrawal of solution therethrough, and connections between said means and the agitators for the return of the withdrawn solution under pressure through the agitators.

6. A leaching apparatus comprising a receiving vessel for the material to be treated, a settling pan arranged within the vessel and dividing the same into an upper and lower compartment, agitating means within each of said compartments, and mechanism for withdrawing solution under treatment from within the compartments and returning the same thereto under pressure through the agitating means.

7. A leaching apparatus comprising a receiving vessel having its interior sub-divided into upper and lower communicating compartments, of means for supplying material for treatment within the upper compartment centrally thereof, a rotary agitator mounted within each of said compartments, suction pipes located within said compartments above the agitators, and mechanism for withdrawing solution under treatment from each of the compartments and returning the same thereto under pressure through the rotary agitators.

8. A leaching apparatus comprising a receiving vessel having its interior divided into upper and lower communicating compartments for material to be treated, of rotary agitating means mounted within each of said compartments, suction withdrawing means arranged above the said agitators, mechanism for withdrawing solution through said suction means and returning the same to the compartments under pressure through the rotary agitators, and means for supplying fresh liquid for replacement purposes.

9. A leaching apparatus comprising a receiving vessel for material to be treated, means for delivering material therein, an overflow runway adjacent the top of said vessel, a settling pan supported within the same to divide the interior thereof into upper and lower communicating compartments, a sump connected with the bottom of the vessel provided with a discharge outlet for solids separated from the material under treatment, suction means within each compartment for the withdrawal of solution therefrom, rotary agitators mounted in said compartment below the suction means, and mechanism outside of the receiving vessel for withdrawing solution through the suction means and restoring the same to the compartments through the agitators.

10. A leaching apparatus comprising a receiving vessel for material to be treated, means for delivering material therein, an overflow runway adjacent the top of said vessel, a settling pan supported within the same to divide the interior thereof into upper and lower communicating compartments, a sump connected with the bottom of the vessel provided with a discharge outlet for solids separated from the solution under treatment, suction means within each compartment for the withdrawal of solution therefrom, rotary agitators mounted in said compartment below the suction means, mechanism outside of the receiving vessel for withdrawing solution through the suction means and restoring the same to the compartments through the agitators, and heating coils arranged within the upper compartment above the suction means therein.

In testimony whereof I have signed my name to this specification in the presence of two subscribing witnesses.

LAMARTINE C. TRENT.

Witnesses.
RUTH H. MOE,
G. M. TRENT.